Figure 1:
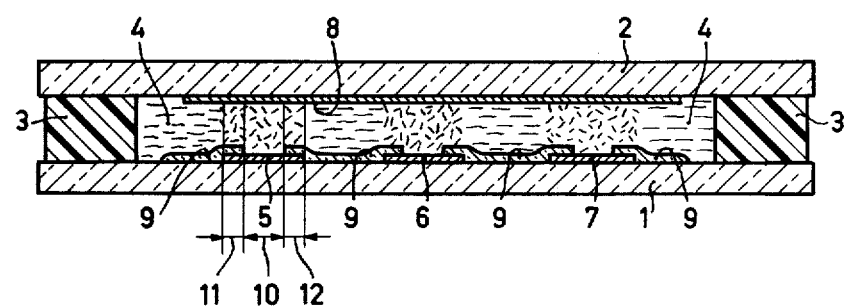

# United States Patent [19]

De Zwart et al.

[11] 4,286,266

[45] Aug. 25, 1981

[54] DISPLAY DEVICE

[75] Inventors: Maarten De Zwart; Johannes L. A. M. Heldens, both of Eindhoven, Netherlands

[73] Assignee: U.S. Philips Corporation, New York, N.Y.

[21] Appl. No.: 968,958

[22] Filed: Dec. 13, 1978

[30] Foreign Application Priority Data

Jan. 18, 1978 [NL] Netherlands .......................... 7800584

[51] Int. Cl.³ .............................................. G08B 5/36
[52] U.S. Cl. .................................... 340/765; 340/784; 350/339 R
[58] Field of Search ...................... 340/765, 784, 715; 350/334, 339 R

[56] References Cited

U.S. PATENT DOCUMENTS

| | | | |
|---|---|---|---|
| 3,740,717 | 6/1973 | Huener et al. | 340/765 X |
| 3,781,862 | 12/1973 | Yamamura | 340/784 X |
| 3,836,229 | 9/1974 | Saurer | 340/785 |
| 3,912,366 | 10/1975 | Sprokel | 350/339 R |

Primary Examiner—David L. Trafton
Attorney, Agent, or Firm—Thomas A. Briody; Robert T. Mayer; Paul R. Miller

[57] ABSTRACT

In a liquid crystal display device which upon controlling with direct voltage shows a memory effect that can be erased by alternating voltage, the written area can expand beyond the edge of the electrode so that edge zones can no longer be erased readily. This disadvantage is avoided by covering the edges of the electrodes with an insulating layer.

3 Claims, 2 Drawing Figures

U.S. Patent    Aug. 25, 1981    4,286,266

DISPLAY DEVICE

The invention relates to a display device comprising two supporting plates, a pattern of control electrodes which can be energized individually on at least one of the supporting plates, a counter electrode on the other supporting plate and a layer of liquid crystal between the two supporting plates in direct contact with the electrodes, wherein a semi-permanent, visible disturbance is induced in the liquid crystal by means of direct voltage and is erased by means of alternating voltage.

Such a display device is used inter alia to display alphanumeric information and is disclosed in U.S. Pat. No. 3,914,019. The liquid crystal consists of a mixture of a nematic and cholesteric liquid crystal which in the undisturbed condition is bright and becomes opaque as a result of current passage. The induced disturbance of the ordering of the molecules of the liquid crystal which causes opacity is semi-permanent. That is to say the disturbance is maintained for a considerable time after the voltage has been switched off. The device disclosed in the U.S. Patent also includes below the control electrodes to be individually energized one extra electrode which extends over the whole supporting plate and is separated from the control electrodes by a dielectric layer. The extra electrode may be energized separately to erase certain irregularities in the transparency which the liquid crystal may show in the initial state, or to erase all information present.

It has now been found that the so-called memory texture in the liquid crystal expands slightly beyond the area of the pertinent control electrode and as a result of this cannot be erased entirely by means of the pertinent control electrode.

It is the object of the invention to construct a display device in such manner that edge zones which cannot be erased by means of the pertinent control electrode are avoided.

According to the invention, a display device of the kind mentioned in the preamble is characterized by having the edges of the control electrodes covered with an insulating layer.

The invention is based on recognition of the fact that in the relevant edge zones no disturbance in the liquid crystal is induced by the control voltage, since this is a direct voltage. The expansion of the disturbance to the edge zones which takes place afterwards, however, is erased because the erasing voltage is an alternating voltage. In a construction according to the invention, extra electrodes are entirely superfluous.

In order to simplify the construction, the insulating layer may also cover the surface of the supporting plate between the electrodes to be individually energized.

A very suitable material for the insulating layer is polyparaxylylene. The use of polyparaxylylene in liquid crystal display devices is known from Netherlands Patent Application No. 74.11.138 laid open to public inspection.

Figure 2:
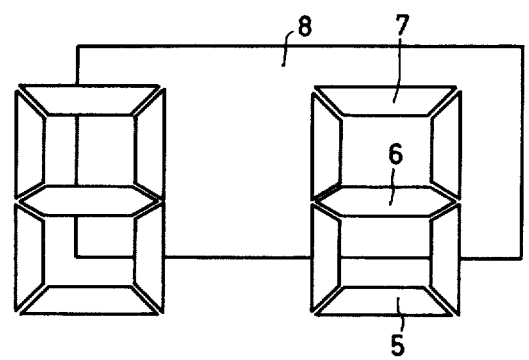

The invention will be described in greater detail with reference to the accompanying drawing, of which FIG. 1 is a sectional view of a display device according to the invention, and FIG. 2 shows an example of an electrode configuration for such a device.

The display device shown in FIG. 1 comprises two glass supporting plates 1 and 2 which are sealed together at their circumference by means of a polyethylene frame 3. The frame 3 also determines the separation between the plates 1 and 2 and seals the space between the plates 1 and 2. The space is filled with a mixture of liquid crystal 4. The layer thickness is from 10 to 15 microns. Plate 1 comprises a pattern of control electrodes to be individually energized with three electrodes being shown and referenced as 5, 6 and 7. Plate 2 has a common counter electrode 8. The control electrodes and the counter electrode may be arranged as is shown diagrammatically in FIG. 2 so as to display the digits 00 and 99. Other arrangements for displaying letters, other characters or figures are, of course, readily possible. The connections between the electrodes and their connections at the edge of the device are not shown. These connections are made entirely in a conventional manner.

If a direct voltage difference is set up between one or more control electrodes on the one hand and the counter electrode on the other hand, a turbulence occurs in the area between the electrodes which can be observed visually as a turbidity in the otherwise transparent liquid crystal and is used for display. Dependent on the composition of the liquid crystal the turbulence is maintained for a shorter or longer time after switching off the voltage. This phenomenon is termed the memory effect. In order to erase the displayed digit, an alternating voltage difference should be applied for a short time between the relevant electrodes and the counter electrode.

It has been found that residues of the turbulence nevertheless remain after erasing in the above-described manner, so that the displayed digits are not erased entirely. Investigations have demonstrated that this phenomenon was caused by the area with the turbulence slightly expanding. It expanded beyond the area where the relevant control electrode is operative and consequently part of the turbulence was not erased completely.

In order to prevent detrimental results of expansion of the turbulence, an insulating layer 9 is also provided on the plate 1 of the device shown in FIG. 1. This layer covers the edges of the control electrodes (for example, 5, 6 and 7) the overlap being e.g. 0.01 mm. The remaining part of the surface of the electrodes remains in direct contact with the liquid crystal 4. Although not strictly necessary for the effect shown, the layer 9 also covers the area between the electrodes 5, 6 and 7.

When a control electrode is energized, turbulence occurs only opposite to the uncovered area of the electrode because the turbulence is caused by a small current passage (injection of charge carriers) as a result of which a liquid flow in the crystal occurs. In FIG. 1 this is denoted for electrode 5 by the area 10. Although during energization the area 10 expands, as shown by the edge zones 11 and 12, the overall area of the turbulence does not become larger than the area occupied by the electrode 5. Since an alternating voltage is used for erasing, the entire electrode 5 is active for erasing due to capacitive effect (also the edge covered by the insulating layer 9) and the turbulence is erased entirely. During erasing, the molecules are aligned by dielectric forces which above a frequency of a few kHz predominate over the charge transport causing the turbulence, so that the undisturbed transparent crystal-like condition returns.

Examples of liquid crystal compositions in which a visible disturbance can be induced by means of direct voltage which can be erased by means of alternating voltage are:

- a mixture of 90% by weight of 4-methoxy benzilydene-4'-butylaniline (MBBA) with 10% by weight of cholesteryl nonanoate
- or a mixture of 61% by weight of 2-(p-methoxyphenyl)-3-(p-pentylphenyl)-acrylonitrile, 29% by weight of 2-(p-butoxyphenyl)-3-(p-pentyl-oxyphenyl)-acrylonitrile with 10% by weight of cholesteryl nonanoate.

In order to be able to observe the turbulence visually, the electrodes on one of the two plates 1 and 2 should be transparent. In the embodiment described all the electrodes are manufactured in a conventional manner from a transparent layer of indium tin oxide.

The insulating layer 9 may be, for example, vapor deposited silicon oxide or polyparaxylylene. The provision of a polyparaxylylene layer is extensively described in the U.S. Pat. No. 3,246,627. The apertures in the layer 9 at the area of the electrodes 5, 6 and 7 are obtained by means of a mask. The thickness of a polyparaxylylene layer is, for example, 0.2 micron.

What is claimed is:

1. A display device comprising at least two supporting plates; a plurality of control electrodes formed in a pattern on at least one of said supporting plates, said control electrodes being individually energized, a counter electrode formed on the other of said supporting plates; a layer of liquid crystal disposed between said supporting plates and in direct contact with said electrodes; a semi-permanent visible disturbance being induced in said liquid crystal by means of direct voltage and being erased by means of alternating voltage; and insulating means for covering at least the edges of said control electrodes said remaining surfaces of said electrodes remaining in direct contact with said liquid crystal.

2. A display device according to claim 1, wherein said insulating means also covers surfaces of said supporting plate between said control electrodes.

3. A display device according to claim 1, wherein said insulating means is a layer of polyparaxylylene.

* * * * *